United States Patent
Beall (10) Patent No.: US 11,831,220 B2
(45) Date of Patent: Nov. 28, 2023

(54) ELECTRIC MOTOR STACK WITH INTEGRAL ONE-PIECE GEARBOX INPUT SHAFT

(71) Applicant: Bell Textron Inc., Fort Worth, TX (US)

(72) Inventor: Grant Beall, Arlington, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 375 days.

(21) Appl. No.: 16/908,286

(22) Filed: Jun. 22, 2020

(65) Prior Publication Data

US 2021/0399607 A1 Dec. 23, 2021

(51) Int. Cl.
| | |
|---|---|
| H02K 7/116 | (2006.01) |
| B64C 29/00 | (2006.01) |
| B64D 27/24 | (2006.01) |
| H02K 5/10 | (2006.01) |
| H02K 5/15 | (2006.01) |
| H02K 7/108 | (2006.01) |
| H02K 11/33 | (2016.01) |

(52) U.S. Cl.
CPC .......... *H02K 7/116* (2013.01); *B64C 29/0033* (2013.01); *B64D 27/24* (2013.01); *H02K 5/10* (2013.01); *H02K 5/15* (2013.01); *H02K 7/108* (2013.01); *H02K 11/33* (2016.01)

(58) Field of Classification Search
CPC . H02K 7/116; H02K 5/10; H02K 5/15; H02K 7/108; H02K 11/33; B64C 29/0033; B64D 27/24; B64D 33/08; B64D 35/08; Y02T 50/60

USPC ...................................................... 310/68 R
See application file for complete search history.

(56) References Cited

U.S. PATENT DOCUMENTS

| | | | | |
|---|---|---|---|---|
| 3,290,574 | A | * 12/1966 | Stilley | H02K 17/36 310/112 |
| 3,797,783 | A | 3/1974 | Kisovec | |
| 4,168,459 | A | * 9/1979 | Roesel, Jr. | H02K 21/046 322/29 |
| 4,476,395 | A | * 10/1984 | Cronin | H02K 7/1807 310/59 |
| 4,945,296 | A | * 7/1990 | Satake | H02K 16/04 310/116 |

(Continued)

FOREIGN PATENT DOCUMENTS

| | | |
|---|---|---|
| DE | 102016220234 A1 | 10/2016 |
| DE | 102015226836 A1 | 7/2017 |

(Continued)

OTHER PUBLICATIONS

USPTO Non-Final Office Action for U.S. Appl. No. 16/808,818 dated Jan. 12, 2022.

(Continued)

*Primary Examiner* — John K Kim
(74) *Attorney, Agent, or Firm* — Akona IP (57) ABSTRACT

A motor assembly is described and includes a housing having a forward endplate and a rear endplate; a plurality of motors disposed within the housing; and a drive shaft driven by the plurality of motors and having a first end extending through the forward endplate of the housing and a second end extending through the rear endplate of the housing, wherein the first end of the drive shaft is configured to engage with a gearbox.

14 Claims, 9 Drawing Sheets

(56) References Cited

U.S. PATENT DOCUMENTS

| | | | |
|---|---|---|---|
| 5,844,341 A * | 12/1998 | Spooner | H02K 16/00 310/410 |
| 5,990,590 A * | 11/1999 | Roesel, Jr. | H02K 7/025 310/112 |
| 6,719,244 B1 | 4/2004 | Gress | |
| 7,309,938 B1 * | 12/2007 | Smith | H02K 47/20 310/156.31 |
| 8,469,306 B2 | 6/2013 | Kuhn, Jr. | |
| 9,156,545 B1 | 10/2015 | Fenny et al. | |
| 9,823,022 B2 | 11/2017 | Rollins et al. | |
| 10,340,779 B2 | 7/2019 | Head et al. | |
| 2002/0079763 A1 | 6/2002 | Fleshman et al. | |
| 2006/0037743 A1 | 2/2006 | Head | |
| 2007/0152523 A1 * | 7/2007 | Bookout | H02K 5/00 310/90 |
| 2007/0273225 A1 | 11/2007 | Head | |
| 2009/0058374 A1 * | 3/2009 | Evans | H02K 11/05 322/29 |
| 2009/0218898 A1 * | 9/2009 | Ribeiro | H02K 7/003 310/112 |
| 2009/0302720 A1 * | 12/2009 | Chiba | H02K 5/24 310/90 |
| 2010/0219779 A1 * | 9/2010 | Bradbrook | F02C 7/32 60/773 |
| 2011/0024555 A1 | 2/2011 | Kuhn, Jr. | |
| 2011/0084561 A1 | 4/2011 | Swales et al. | |
| 2012/0282103 A1 | 11/2012 | Muren | |
| 2013/0110333 A1 * | 5/2013 | Song | B60W 20/13 310/78 |
| 2013/0342084 A1 * | 12/2013 | Su | H02K 9/06 310/60 R |
| 2014/0151495 A1 | 6/2014 | Kuhn, Jr. | |
| 2014/0159531 A1 * | 6/2014 | Cho | B60L 15/2009 310/156.48 |
| 2014/0299708 A1 | 10/2014 | Green et al. | |
| 2015/0330452 A1 * | 11/2015 | Mongeau | H02K 5/1732 310/90 |
| 2015/0365022 A1 * | 12/2015 | DiMarco | H02K 7/108 310/78 |
| 2016/0099628 A1 | 4/2016 | Ried et al. | |
| 2017/0190435 A1 * | 7/2017 | Kobayashi | H02P 29/10 |
| 2017/0217600 A1 | 8/2017 | Regev | |
| 2017/0274992 A1 | 9/2017 | Chretien | |
| 2018/0026504 A1 * | 1/2018 | Huang | H02K 15/14 310/54 |
| 2018/0050811 A1 | 2/2018 | Niergarth et al. | |
| 2018/0057157 A1 | 3/2018 | Groninga et al. | |
| 2018/0065741 A1 | 3/2018 | Vondrell | |
| 2018/0251226 A1 | 9/2018 | Fenny et al. | |
| 2018/0257761 A1 | 9/2018 | Oldroyd et al. | |
| 2018/0362160 A1 | 12/2018 | Groninga et al. | |
| 2019/0031336 A1 | 1/2019 | McCullough et al. | |
| 2019/0135427 A1 | 5/2019 | Robertson et al. | |
| 2019/0144126 A1 | 5/2019 | Groninga et al. | |
| 2019/0149012 A1 * | 5/2019 | Jackson | H02K 7/14 310/90 |
| 2019/0149018 A1 * | 5/2019 | Lin | H02K 9/225 29/596 |
| 2019/0193835 A1 | 6/2019 | Sandberg et al. | |
| 2019/0270516 A1 | 9/2019 | Sinusas et al. | |
| 2019/0288571 A1 | 9/2019 | Lehikoinen et al. | |
| 2019/0301537 A1 | 10/2019 | Olson | |
| 2019/0329859 A1 | 10/2019 | Bevirt et al. | |
| 2019/0389570 A1 | 12/2019 | Lauder | |
| 2020/0028389 A1 * | 1/2020 | Long | H02K 7/14 |
| 2020/0381984 A1 * | 12/2020 | Sercombe | B64D 31/00 |
| 2021/0039796 A1 | 2/2021 | Hirabayashi et al. | |
| 2021/0399607 A1 * | 12/2021 | Beall | H02K 7/108 |
| 2021/0403173 A1 * | 12/2021 | Speller | F16J 15/3268 |
| 2021/0403174 A1 * | 12/2021 | Beall | B64C 11/001 |

FOREIGN PATENT DOCUMENTS

| | | |
|---|---|---|
| EP | 3171496 A1 | 5/2017 |
| EP | 2353684 B1 | 10/2017 |
| EP | 3486170 A1 | 5/2019 |
| EP | 3598616 A1 | 1/2020 |
| EP | 3738887 A1 | 11/2020 |
| EP | 3875375 | 11/2022 |
| WO | 2010123601 | 10/2010 |
| WO | 2016020915 | 2/2016 |
| WO | 2018045253 A1 | 3/2018 |
| WO | 2019040490 A1 | 2/2019 |
| WO | 2019079688 A1 | 4/2019 |

OTHER PUBLICATIONS

EPO Examination Report issued in EP Application 21207937.0 dated Apr. 2021, 8 pages.
USPTO Non-Final Office Action for U.S. Appl. No. 16/808,851 dated May 18, 2022.
EPO Examination Report issued in EP Application 21173897.6 dated Nov. 15, 2021, 8 pages.
EPO Search Report issued in EP Application 21173899.2 dated Nov. 5, 2021, 4 pages.
USPTO Non-Final Office Action for U.S. Appl. No. 16/912,345 dated Apr. 13, 2022.
EPO Search Report issued in EP Application 21173897.6 dated Nov. 3, 2021, 4 pages.
USPTO Non-Final Office Action for U.S. Appl. No. 16/808,836 dated Mar. 23, 2022.
EPO Search Report issued in EP Application 21207937.0 dated Apr. 14, 2022, 4 pages.
USPTO Final Office Action for U.S. Appl. No. 16/808,818 dated Apr. 24, 2022.
EPO Examination Report issued in EP Application 21156415.8 dated Aug. 18, 2021, 8 pages.
EPO Search Report issued in EP Application 21156415.8 dated Aug. 5, 2021, 4 pages.
EPO Examination Report issued in EP Application 21173899.2 dated Dec. 1, 2021, 8 pages.
EPO Examination Report issued in EP Application 21156416.6 dated Jul. 21, 2021, 5 pages.
EPO Examination Report issued in EP Application 21156417.4 dated Jul. 23, 2021, 6 pages.
EPO Search Report issued in EP Application 21156416.6 dated Jul. 9, 2021, 4 pages.
EPO Search Report issued in EP Application 21156417.4 dated Jul. 12, 2021, 4 pages.

* cited by examiner

ELECTRIC MOTOR STACK WITH INTEGRAL ONE-PIECE GEARBOX INPUT SHAFT

TECHNICAL FIELD

This disclosure relates in general to the field of aircraft and, more particularly, though not exclusively, to an electric motor stack with an integral one-piece gearbox input shaft for such aircraft.

BACKGROUND

An electric motor may be used by aircraft as a power source for various functions, such as supplying rotational energy in an aircraft propulsion system. In aircraft propulsion systems that utilize only a single motor, the lack of a backup motor increases the likelihood of a crash or other catastrophic condition should the motor fail. A single motor propulsion system also may not meet the power demands required by the propulsion system in the most efficient manner. Using two or more motors in a propulsion system addresses these concerns but may give rise to other issues.

SUMMARY

One embodiment is a motor assembly comprising a housing having a forward endplate and a rear endplate; a plurality of motors disposed within the housing; and a drive shaft driven by the plurality of motors and having a first end extending through the forward endplate of the housing and a second end extending through the rear endplate of the housing, wherein the first end of the drive shaft is configured to engage with a gearbox.

Another embodiment is a rotor system comprising a gear box; and a motor assembly comprising a housing having a forward endplate and a rear endplate; a plurality of motors disposed within the housing; and a drive shaft driven by the plurality of motors and having a first end extending through the forward endplate of the housing and a second end extending through the rear endplate of the housing, wherein the first end of the drive shaft is configured to engage with the gearbox.

Yet another embodiment is an aircraft including a rotor assembly, the rotor system comprising a gear box; and a motor assembly comprising a housing having a forward endplate and a rear endplate; a plurality of motors disposed within the housing; and a drive shaft driven by the plurality of motors and having a first end extending through the forward endplate of the housing and a second end extending through the rear endplate of the housing, wherein the first end of the drive shaft is configured to engage with the gearbox.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Embodiments described herein is a design for an electric motor stack for driving a gearbox. In accordance with features of embodiments described herein, the electric motor stack includes three radial flux motor cores with an integral one-piece drive shaft housed within a shared housing. The drive shaft is supported through forward (or front) and rear (or back) endplates of the housing by bearings. The housing is sealed by an o-ring around the endplate mating surfaces and by a dynamic lip seal around the drive shaft in the front and back of the housing. The forward end of the drive shaft plugs into the gearbox to drive the gearbox rotors.

Figure 1A:
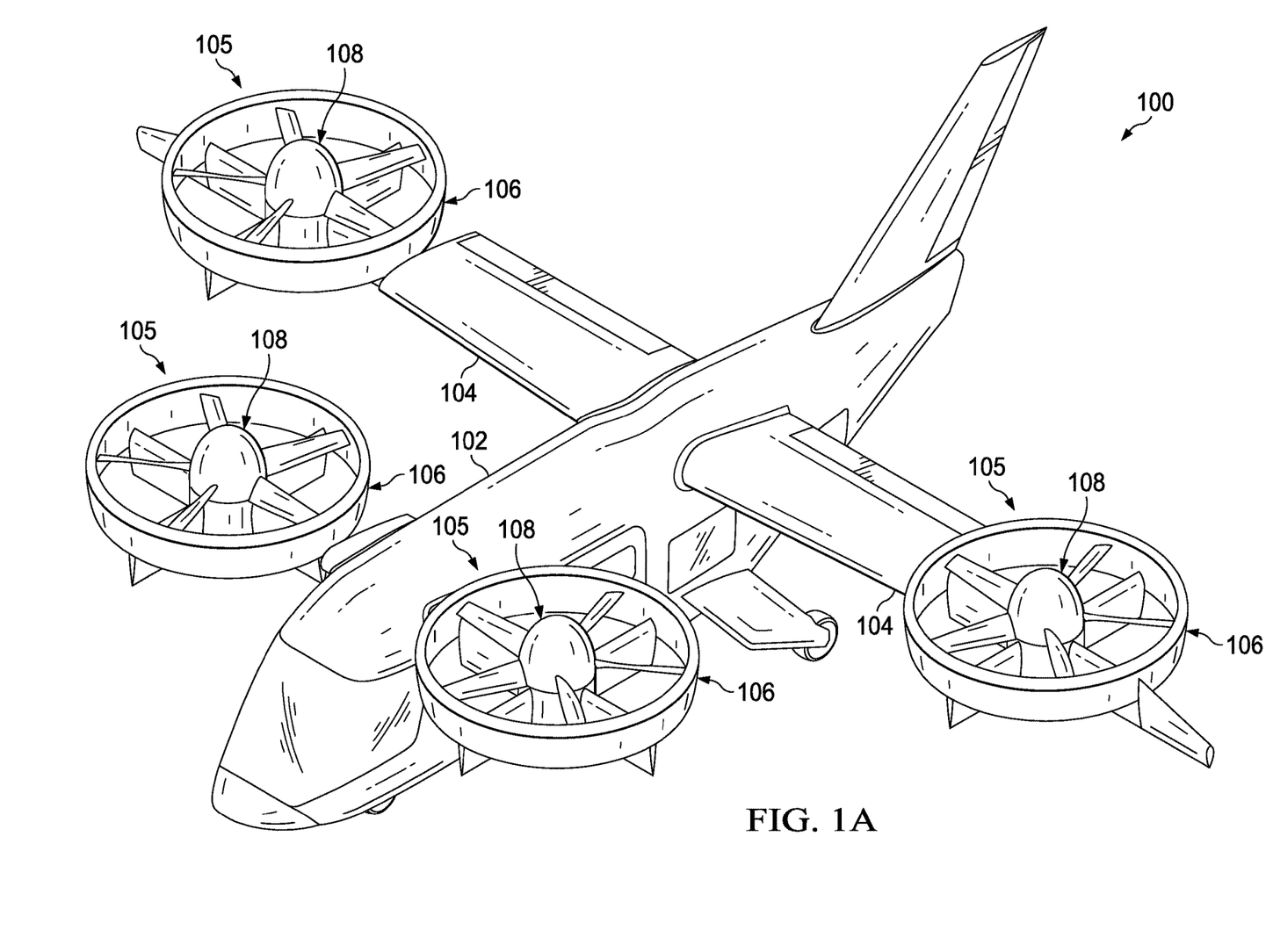
FIGS. 1A-1B illustrate a tilting ducted rotor aircraft including an electric motor stack with an integral one-piece gearbox input shaft in accordance with embodiments described herein.
Figure 1B:
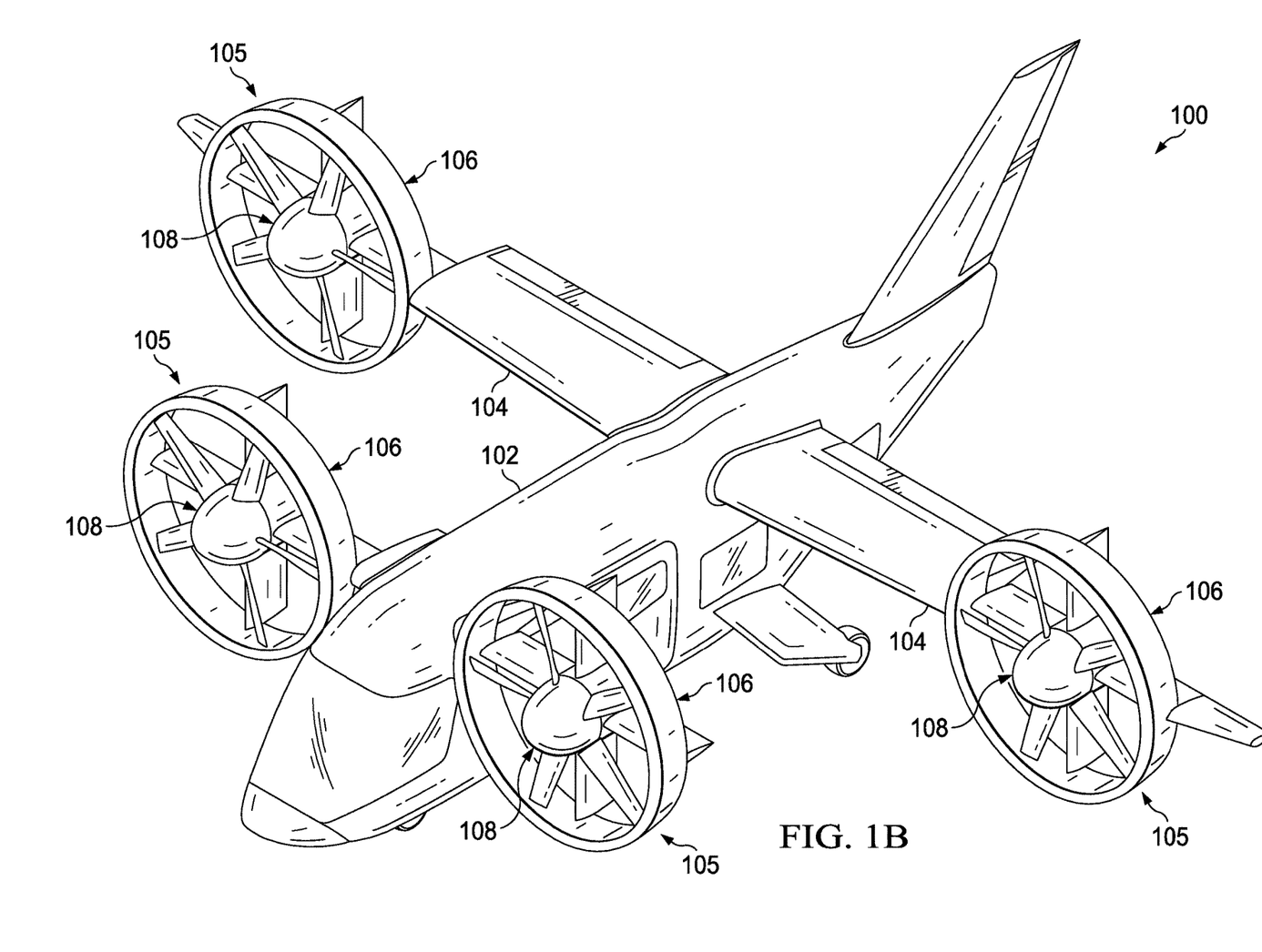
Figure 2:
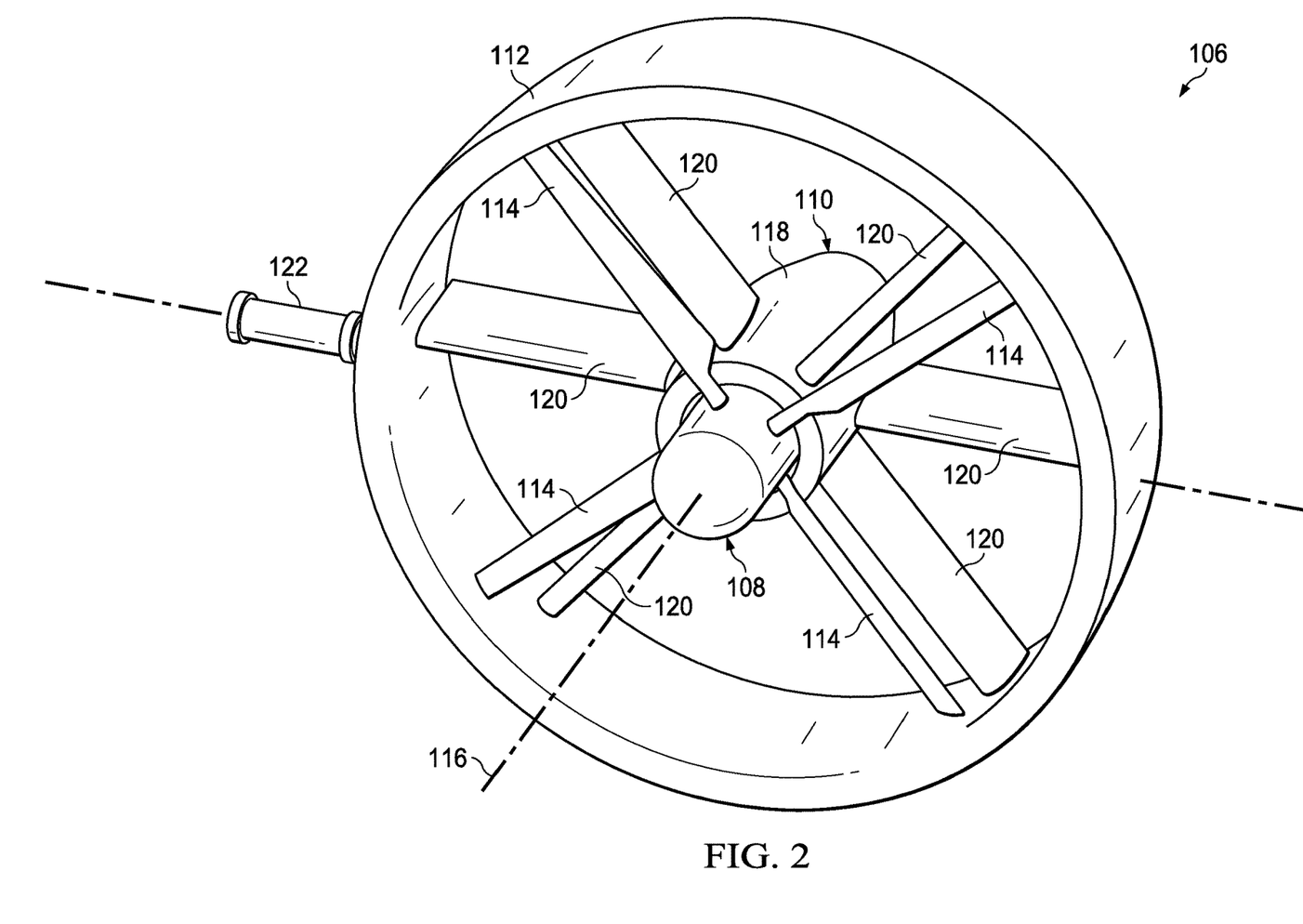
FIG. 2 illustrates a ducted rotor of the aircraft of FIGS. 1A-1B in accordance with embodiments described herein.

FIGS. 1A and 1B illustrate an example tiltrotor aircraft 100 that includes ducted rotors (or fans). The tiltrotor aircraft 100 is convertible between a helicopter mode (shown in FIG. 1A), which allows for vertical takeoff and landing, hovering, and low speed directional movement, and an airplane mode (shown in FIG. 1B), which allows for forward flight as well as horizontal takeoff and landing. Aircraft 100 includes a fuselage 102, wings 104, and a plurality propulsion assemblies 105 each comprising a ducted fan 106 rotatably coupled to fuselage 102 or wings 104. As best shown in FIG. 2, each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates lift while operating in helicopter mode and thrust while operating in airplane mode. Stator assembly 110 is positioned downstream of rotor blades 114 and includes a stator hub 118 centrally located within duct 112 and a plurality of stator vanes 120 coupled between duct 112 and stator hub 118. Stator hub 118 may house an electric motor therein configured to produce rotational energy that drives the rotation of rotor assembly 108. Alternatively, stator hub 118 may house a gearbox therein that drives the rotation of rotor assembly 108, wherein the gearbox receives rotational energy from a drive shaft passing through an attachment post 122 and the adjacent stator vane 120.

Rotor blade assemblies 108 can be collectively manipulated to selectively control direction, thrust, and lift of tilting ducted fan aircraft 100. Indeed, the collective pitch of rotor blade assemblies 108 may be independently controlled from one another to allow for differential thrust output by ducted fans 106. For example, the collective pitch of the rotor blade assembly of one ducted fan may be higher or lower than the collective pitch of rotor blade assembly of another ducted fan such that the thrust generated by each ducted fan differs from each of the others.

Ducted fans 106 are each convertible, relative to fuselage 102, between a horizontal position, as shown in FIG. 1A, and a vertical position, as shown in FIG. 1B. Ducted fans 106 are in the horizontal position during vertical takeoff and landing mode. Vertical takeoff and landing mode may be considered to include hover operations of tilting ducted fan aircraft 100. Ducted fans 106 are in the vertical position during forward flight mode, in which tilting ducted fan aircraft 100 is in forward flight. In forward flight mode, ducted fans 106 direct their respective thrusts in the aft direction to propel tilting ducted fan aircraft 10 forward. Tilting ducted fan aircraft 100 is operable to fly in all directions during the vertical takeoff and landing mode configuration of FIG. 1A, although faster forward flight is achievable while in the forward flight mode configuration of FIG. 1B. Ducted fans 106 may be tiltable between the vertical and horizontal positions by a rotatable shafts (not shown) extending through wings 104 and which are rotatable in response to commands originating from a pilot and/or a flight control system.

Figure 3:
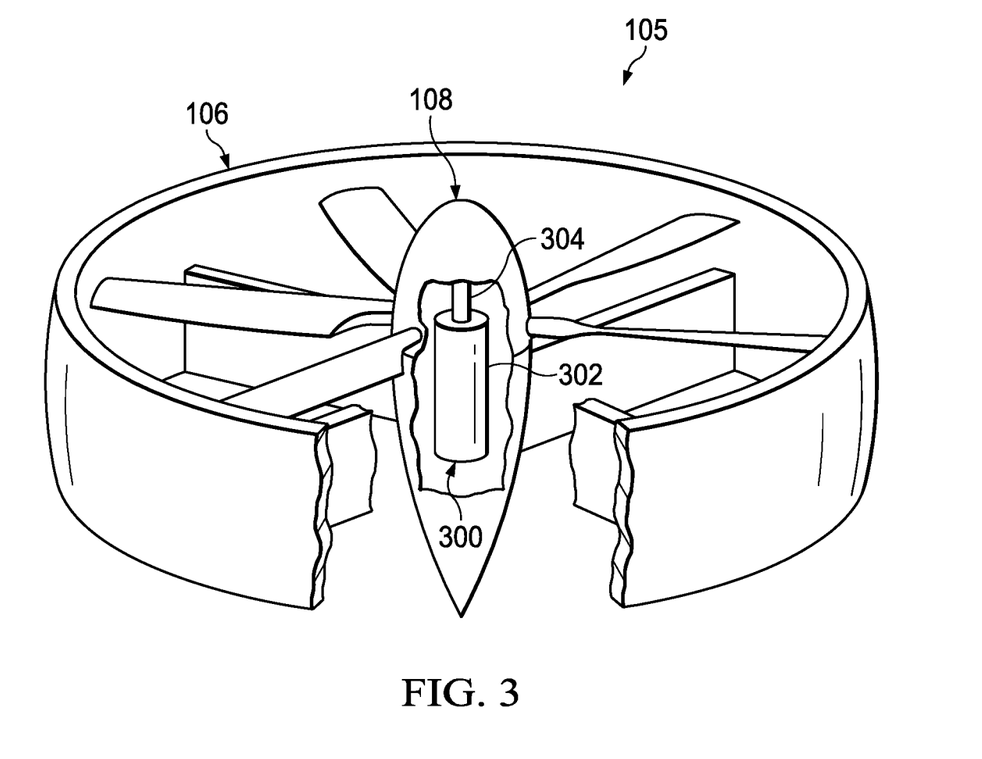
FIG. 3 is a close-up cutaway view of a portion of the ducted rotor of FIG. 2 in accordance with embodiments described herein.

As shown in FIG. 3, and as will be described in detail below, each of the propulsion assemblies 105 utilize an electric motor stack and gear box unit 300 disposed within a respective rotatable pylon 302 as a power source to rotate the respective rotor hub assembly 108 via a rotor mast 304.

Figure 4A:
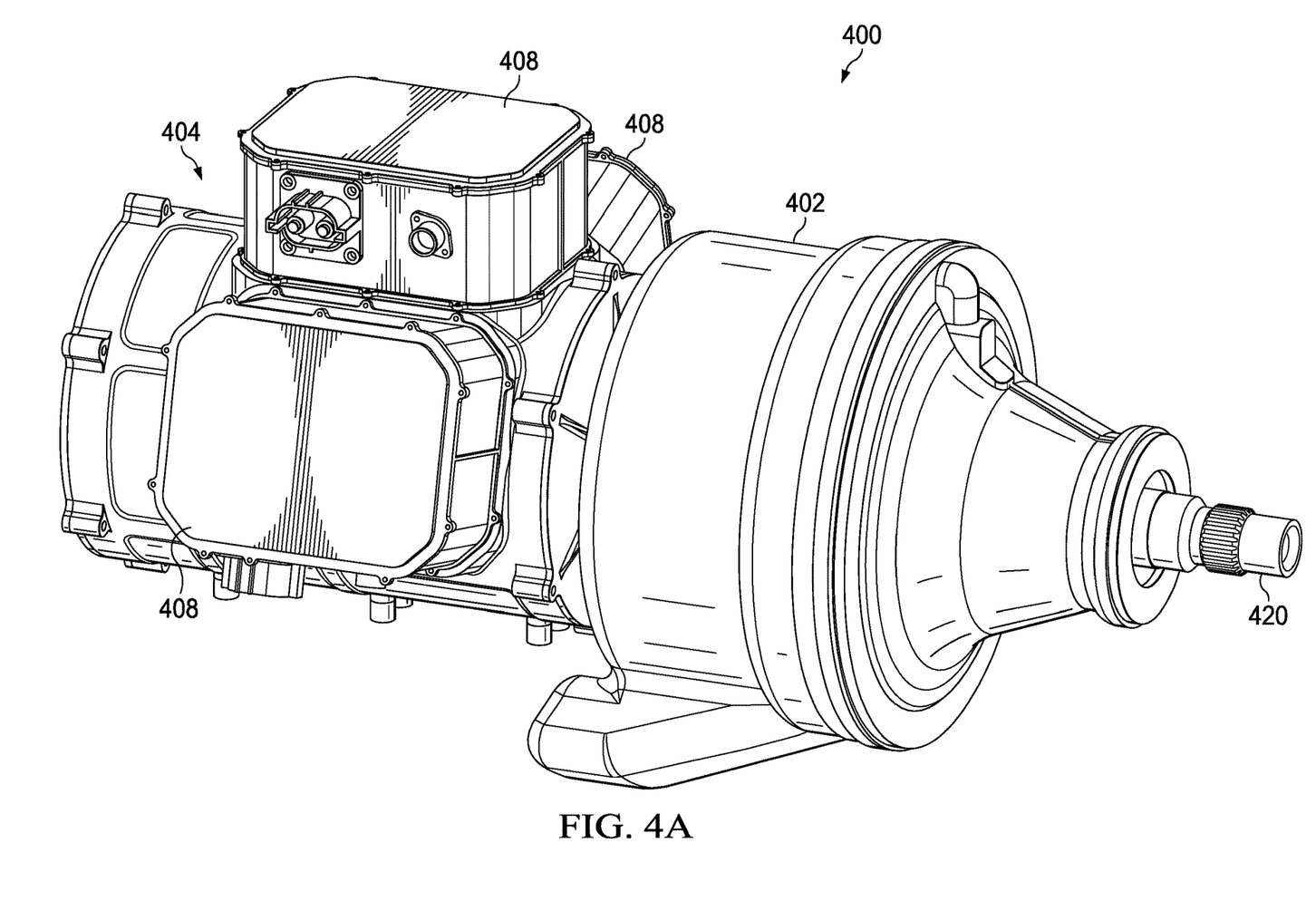
FIG. 4A illustrates an exterior of an example electric motor stack and gear box unit wherein the electric motor stack includes an integral one-piece gearbox input shaft in accordance with embodiments described herein for implementation in aircraft having ducted rotors, such as that illustrated in FIGS. 1A-1B.
Figure 4B:
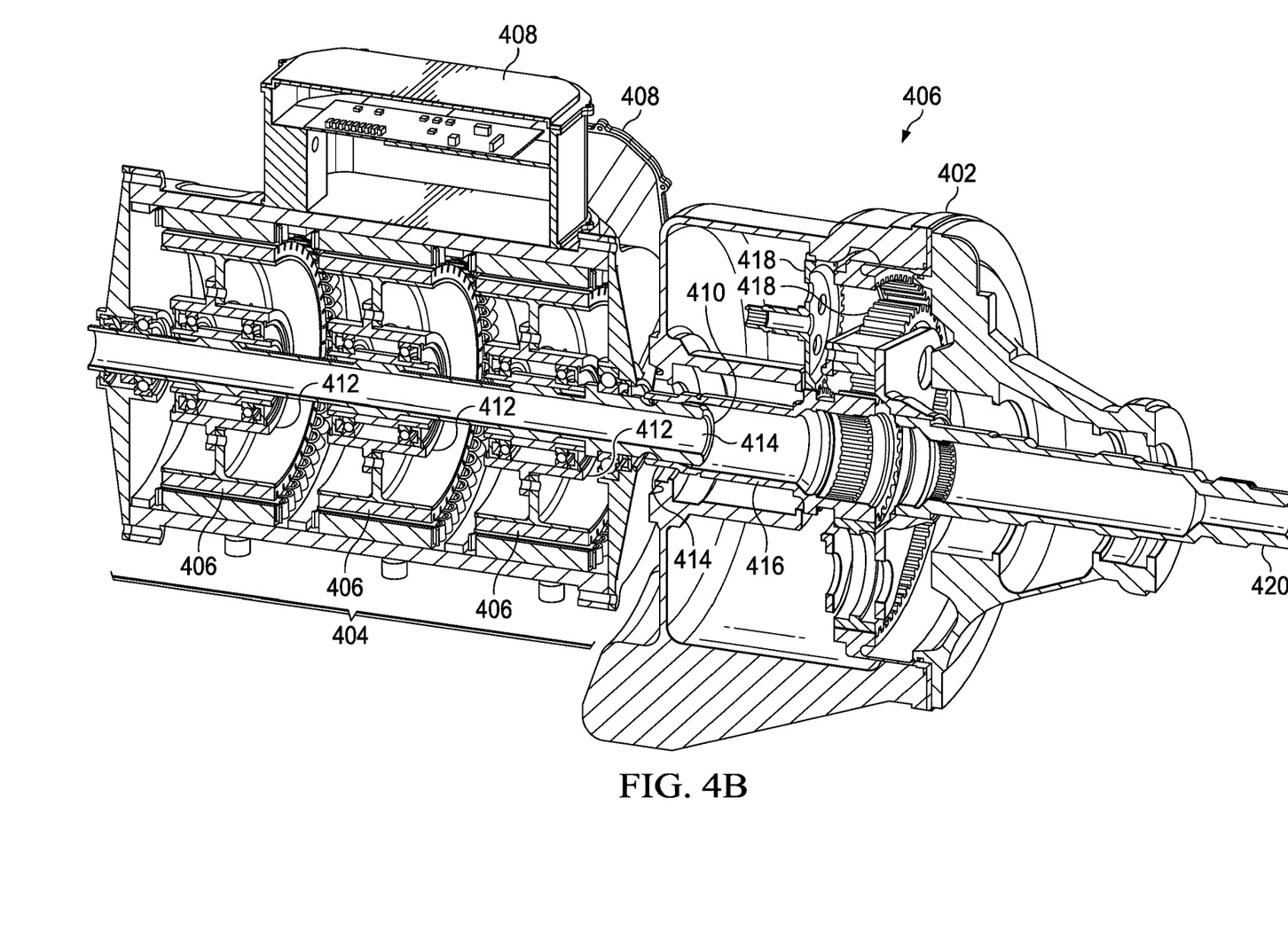
FIG. 4B illustrates a cutaway view of the example electric motor stack and gear box unit wherein the electric motor stack includes an integral one-piece gearbox input shaft illustrated in FIG. 4A.

Referring now to FIG. 4A, illustrated therein is an electric motor stack and gearbox unit 400 that may be used as a power source to rotate a rotor hub assembly, such as rotor hub assembly 108 (FIGS. 1A and 1B), and that may be used to implement electric motor stack and gear box unit 300 (FIG. 3). FIG. 4B is a cutaway view of the electric motor stack and gearbox unit 400. As shown in FIGS. 4A and 4B, the unit 400 includes a gear box 402 and an electric motor stack comprising a plurality of electric motors 406 and associated power electronics 408. In certain embodiments, electric motors 406 may be implemented as radial flux motors.

As best shown in FIG. 4B, the motors 406 of the electric motor stack 404 collectively drive (i.e., provide rotational power to) an integral drive shaft 410. Each of the motors 406 is connected to the drive shaft 410 via a respective one of overrunning clutches 412, each of which transmits torque in one direction only and permits the drive shaft 410 to "freewheel," or continue to rotate, when the respective one of the motors 406 is stopped (e.g., upon failure of the motor). As will be described in greater detail hereinbelow, a forward end of drive shaft 410 is received within a receptacle 414 of the gearbox 402 for providing rotational power to a second drive shaft 416 disposed within gearbox 404 for driving gearbox gears 418. Gearbox gears 418 operate to transfer torque to a rotor shaft 420 connected to rotor assembly (FIG. 2). It will be noted that, although motor stack 404 is illustrated as including three motors, more or fewer motors may be included without departing from the spirit or scope of embodiments described herein.

Figure 5:
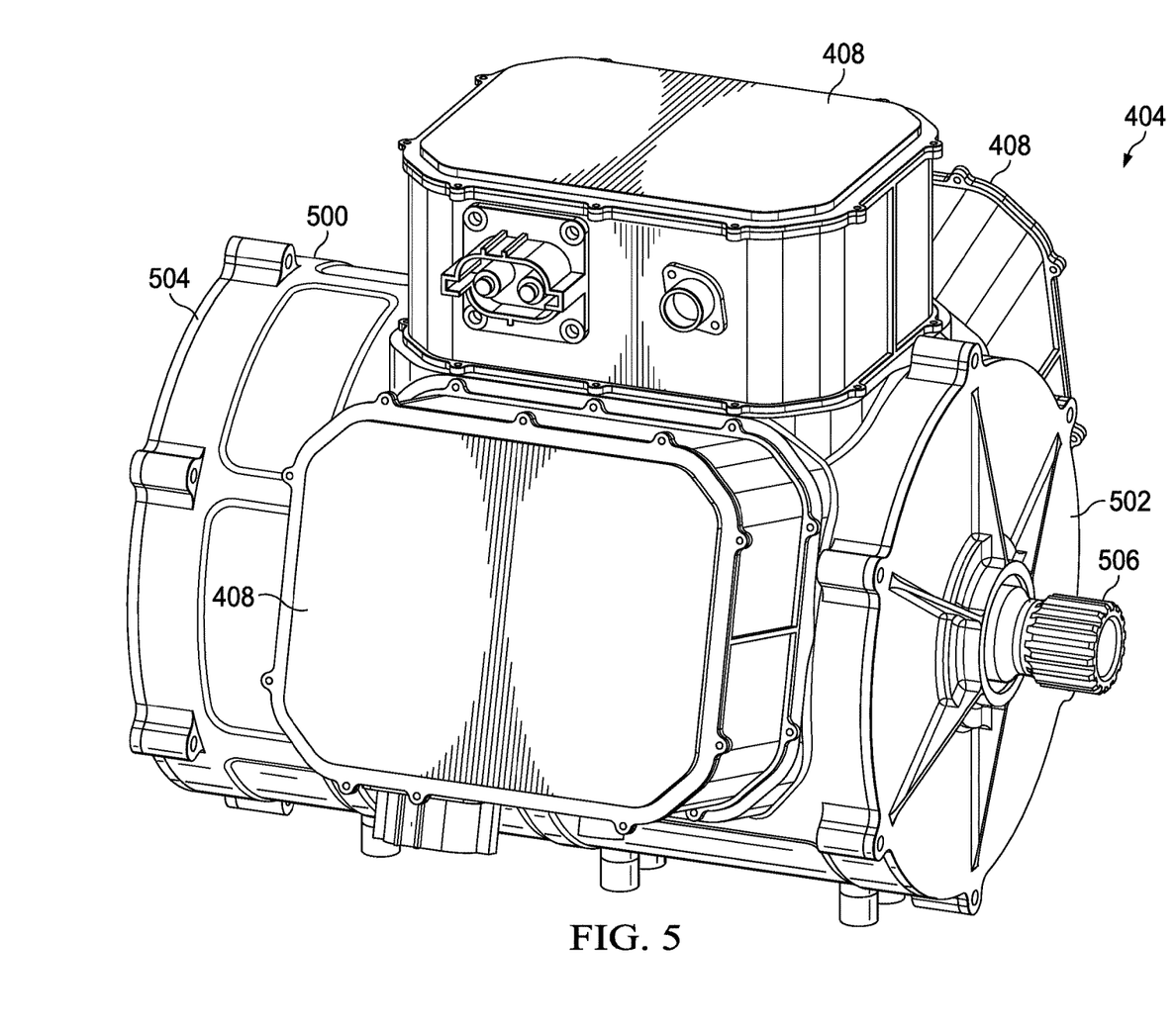
FIG. 5 is a more detailed view of the exterior of the electric motor stack of FIGS. 4A and 4B.
Figure 6:
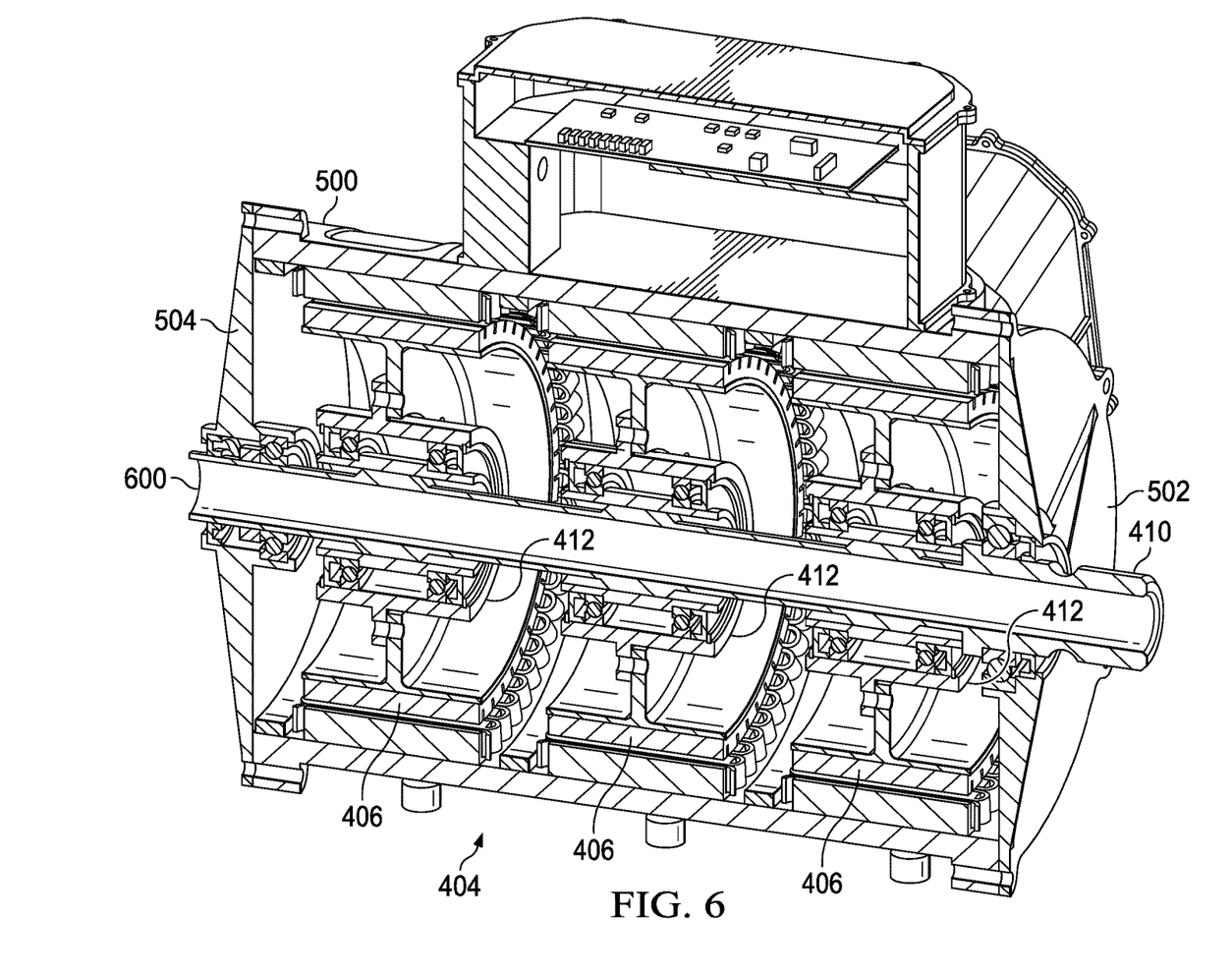
FIG. 6 is a more detailed cutaway view of the electric motor stack of FIG. 5.

FIG. 5 is a perspective view of an exterior of the electric motor stack 404 illustrating details of a housing 500 thereof. FIG. 6 is a cutaway view of the electric motor stack 404 as shown in FIG. 5. Housing 500 includes a forward endplate 502 and a rear endplate 504 through which ends of drive shaft 410 extend. As will be described in greater detail hereinbelow, mechanisms are provided in forward endplate 502 and rear endplate 504 for securely supporting ends of drive shaft 410. A forward end 506 of drive shaft 410 extends through an opening in approximately a center of forward endplate 502 and is splined for interconnecting with receptacle 414, which is splined in a complementary manner such that the drive shaft 410 imparts rotational energy to the second drive shaft 416 of gearbox 402.

As best shown in FIG. 6, a rear end 600 of drive shaft extends through the rear endplate 504 of housing 500. As previously noted, forward end 506 of drive shaft 410 is splined to mate with a splined receptacle disposed within gearbox 402 (not shown in FIG. 6) to drive second drive shaft 416 (not shown in FIG. 6).

Figure 7:
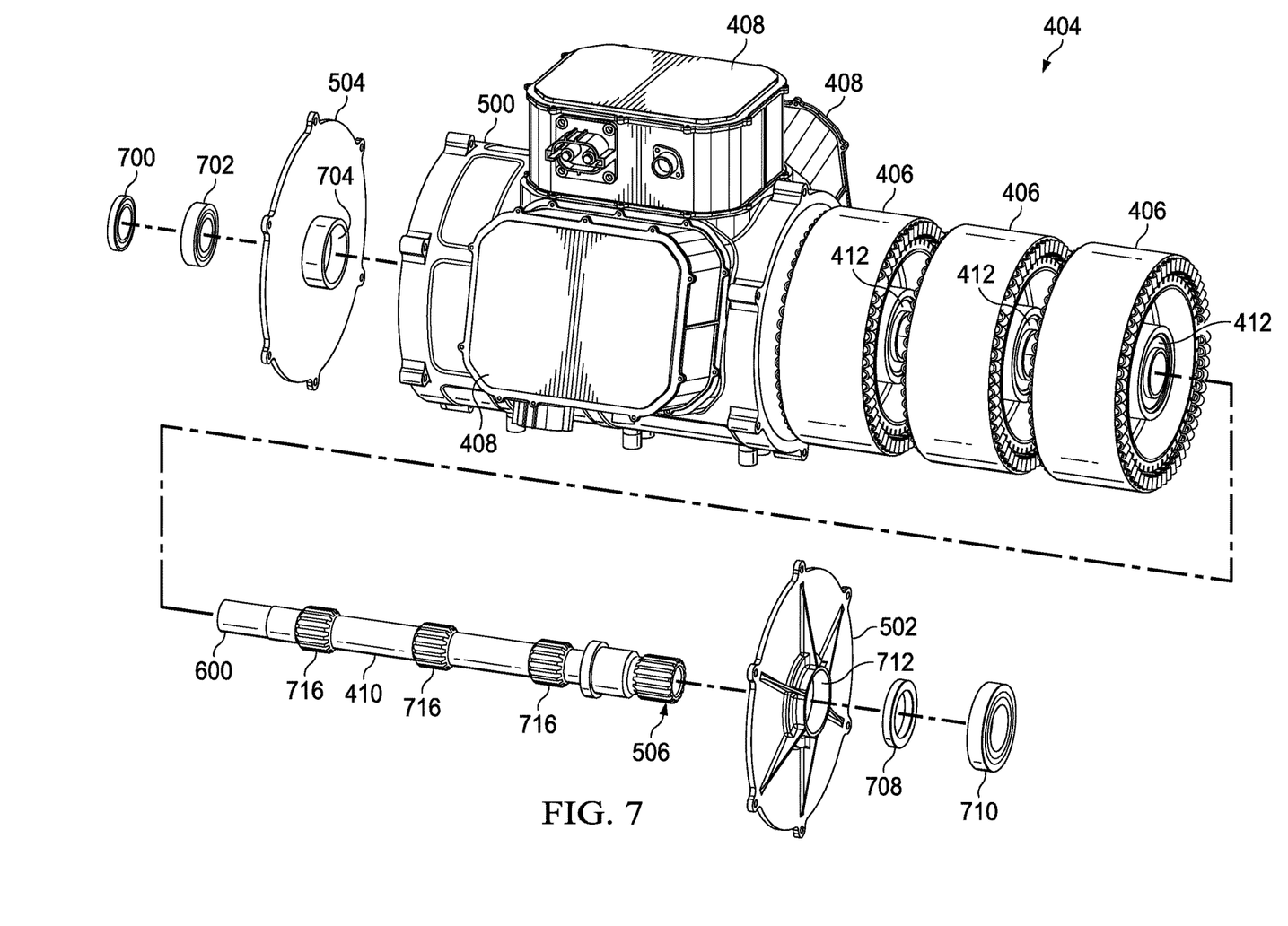
FIG. 7 is an exploded view of the electric motor stack of FIG. 5.

FIG. 7 is an exploded view of the electric motor stack 404 as shown in FIGS. 5 and 6. Referring to FIG. 7, in addition to housing 500 including front endplate 502 and rear endplate 504, motors 406, motor controller electronics 408, drive shaft 410, and overrunning clutches 412, motor stack 404 includes a rear bearing 700 and a rear main seal 702 associated with a shaft opening 706 disposed in rear endplate 504 and a forward main seal 708 and a forward bearing 710 associated with a shaft opening 712 disposed in forward endplate 502. As shown in FIG. 7, drive shaft 410 includes splined portions 716, which are engaged by motors 406 for applying rotational power to drive shaft 410.

The drive shaft 410 is supported through forward (or front) endplate 502 and rear (or back) endplates 504 of the housing 500 by forward bearing 710 and rear bearing 700, respectively. Seals 702, 708, for sealing the housing 500 around the openings 706, 712, may be implemented with o-rings around the mating surfaces of endplates 504, 502, and dynamic lip seals around the drive shaft 410 in the front and back of the housing 500.

It should be appreciated that aircraft illustrated herein, such as ducted rotor aircraft 100, is merely illustrative of a variety of aircraft that can implement the embodiments disclosed herein. Indeed, the various embodiments of the electric motor stack and gearbox unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, more or fewer ducted fans or non-ducted rotors and the like. As such, those skilled in the art will recognize that the embodiments described herein for an electric motor stack and gearbox unit can be integrated into a variety of aircraft configurations. It should be appreciated that even though aircraft are particularly well-suited to implement the embodiments of the present disclosure, non-aircraft vehicles and devices can also implement the embodiments.

The components of rotor assembly 108 may comprise any materials suitable for use with an aircraft rotor. For example, rotor blades 114 and rotor hub may comprise carbon fiber or aluminum; and rotor mast may comprise steel or titanium. While rotor hub assembly 108 are shown with four rotor blades 114, respectively, it should be understood that they may have as few as two rotor blades and may have more than four rotor blades.

Example 1 is a motor assembly including a housing having a forward endplate and a rear endplate; a plurality of motors disposed within the housing; and a drive shaft driven by the plurality of motors and having a first end extending through the forward endplate of the housing and a second end extending through the rear endplate of the housing, wherein the first end of the drive shaft is configured to engage with a gearbox.

In Example 2, the motor assembly of Example 1 may further include each of the motors comprising a radial flux motor core.

In Example 3, the motor assembly of any of Examples 1-2 may further include the plurality of motors together comprising a motor stack.

In Example 4, the motor assembly of any of Examples 1-3 may further include the plurality of motors comprising three motors.

In Example 5, the motor assembly of any of Examples 1-4 may further include the motors being connected to the drive shaft via overrunning clutches.

In Example 6, the motor assembly of any of Examples 1-5 may further include the first end of the drive shaft extending through an opening in a center of the front endplate, the first end of the drive shaft being supported by bearings and the opening around the first end of the drive shaft being sealed by an O-ring.

In Example 7, the motor assembly of any of Examples 1-6 may further include the second end of the drive shaft extending through an opening in a center of the rear endplate, the second end of the drive shaft being supported by bearings and the opening around the second end of the drive shaft being sealed by an O-ring.

In Example 8, the motor assembly of any of Examples 1-7 may further include power electronics associated with the motors and disposed within the housing.

Example 9 is a rotor system including a gear box and a motor assembly comprising a housing having a forward endplate and a rear endplate; a plurality of motors disposed within the housing; and a drive shaft driven by the plurality of motors and having a first end extending through the forward endplate of the housing and a second end extending through the rear endplate of the housing, wherein the first end of the drive shaft is configured to engage with the gearbox.

In Example 10, the rotor system of Example 9 may further include each of the motors comprising a radial flux motor core.

In Example 11, the rotor system of any of Examples 9-10 may further include the motors being connected to the drive shaft via overrunning clutches.

In Example 12, the rotor system of any of Examples 9-11 may further include the first end of the drive shaft extending through an opening in a center of the front endplate, the first end of the drive shaft being supported by bearings and the opening around the first end of the drive shaft being sealed by an O-ring.

In Example 13, the rotor system of any of Examples 9-12 may further include the second end of the drive shaft extending through an opening in a center of the rear endplate, the second end of the drive shaft being supported by bearings and the opening around the second end of the drive shaft being sealed by an O-ring.

In Example 14, the rotor system of any of Examples 9-13 may further include power electronics associated with the motors and disposed within the housing.

Example 15 is an aircraft including a rotor assembly, the rotor system comprising a gear box; and a motor assembly comprising a housing having a forward endplate and a rear endplate; a plurality of motors disposed within the housing; and a drive shaft driven by the plurality of motors and having a first end extending through the forward endplate of the housing and a second end extending through the rear endplate of the housing, wherein the first end of the drive shaft is configured to engage with the gearbox.

In Example 16, the aircraft of Example 15 may further include each of the motors comprising a radial flux motor core.

In Example 17, the aircraft of any of Examples 15-16 may further include the motors being connected to the drive shaft via overrunning clutches.

In Example 18, the aircraft of any of Examples 15-17 may further include the first end of the drive shaft extending through an opening in a center of the front endplate, the first end of the drive shaft being supported by bearings and the opening around the first end of the drive shaft being sealed by an O-ring.

In Example 19, the aircraft of any of Examples 15-18 may further include the second end of the drive shaft extending through an opening in a center of the rear endplate, the second end of the drive shaft being supported by bearings and the opening around the second end of the drive shaft being sealed by an O-ring.

In Example 20, the aircraft of any of Examples 15-19 may further include power electronics associated with the motors and disposed within the housing.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A motor assembly comprising:
a housing including a forward endplate and a rear endplate;
a plurality of motors enclosed within the housing; and
a drive shaft driven by the plurality of motors and having a first end extending through the forward endplate of the housing and a second end extending through the rear endplate of the housing, wherein the first end of the drive shaft is splined and mates with a corresponding splined receptacle of a gearbox to provide rotational force to an aircraft rotor assembly via the gear box during normal operation of the motor assembly,
wherein the motors arranged in a stacked configuration and connected to the drive shaft via overrunning clutches, and
wherein the first end of the drive shaft extends through an opening in a center of the front endplate, the first end of the drive shaft being supported by first bearings and the opening around the first end of the drive shaft being sealed by a first O-ring.

2. The motor assembly of claim 1, wherein each of the motors comprises a radial flux motor core.

3. The motor assembly of claim 1, wherein the plurality of motors comprises a motor stack.

4. The motor assembly of claim 1, wherein the plurality of motors comprises three motors.

5. The motor assembly of claim 1, wherein the second end of the drive shaft extends through an opening in a center of the rear endplate, the second end of the drive shaft being supported by bearings and the opening around the second end of the drive shaft being sealed by an O-ring.

6. The motor assembly of claim 1, wherein the housing comprises a first housing, the motor assembly further comprising power electronics associated with the motors and disposed within a second housing associated with the first housing.

7. A rotor system for providing lift and thrust for an aircraft, the rotor system comprising:
a gear box connected to a rotor assembly; and
a motor assembly comprising:
a housing having a forward endplate and a rear endplate;
a plurality of motors disposed within the housing; and
a drive shaft driven by the plurality of motors and having a first end extending through the forward endplate of the housing and a second end extending through the rear endplate of the housing, wherein the first end of the drive shaft is splined and mates with a splined receptacle of the gearbox, the drive shaft providing rotational energy to the rotor assembly via the gearbox,
wherein the motors arranged in a stacked configuration and connected to the drive shaft via overrunning clutches, and
wherein the first end of the drive shaft extends through an opening in a center of the front endplate, the first end of the drive shaft being supported by first bearings and the opening around the first end of the drive shaft being sealed by a first O-ring.

8. The rotor system of claim 7, wherein each of the motors comprises a radial flux motor core.

9. The rotor system of claim 7, wherein the second end of the drive shaft extends through an opening in a center of the rear endplate, the second end of the drive shaft being supported by second bearings and the opening around the second end of the drive shaft being sealed by a second O-ring.

10. The rotor system of claim 7, wherein the housing comprises a first housing, the motor assembly further comprising power electronics associated with the motors and disposed within a second housing associated with the first housing.

11. An aircraft including:
a rotor assembly, the rotor assembly comprising:
a plurality of rotors connected to a rotor shaft;
a gear box configured to provide rotational energy to the rotor shaft; and
a motor assembly comprising:
a housing including a forward endplate and a rear endplate;
a plurality of motors disposed within the housing; and
a drive shaft driven by the plurality of motors and having a first end extending through the forward endplate of the housing and a second end extending through the rear endplate of the housing,
wherein the first end of the drive shaft is splined to mate with a corresponding receptacle of the gearbox for providing rotational energy to the rotor shaft via the gearbox,
wherein the motors arranged in a stacked configuration and connected to the drive shaft via overrunning clutches, and
wherein the first end of the drive shaft extends through an opening in a center of the front endplate, the first end of the drive shaft being supported by first bearings and the opening around the first end of the drive shaft being sealed by a first O-ring.

12. The aircraft of claim 11, wherein each of the motors comprises a radial flux motor core.

13. The aircraft of claim 11, wherein the second end of the drive shaft extends through an opening in a center of the rear endplate, the second end of the drive shaft being supported by bearings and the opening around the second end of the drive shaft being sealed by an O-ring.

14. The aircraft of claim 11, wherein the housing comprises a first housing, the motor assembly further comprising power electronics associated with the motors and disposed within a second housing associated with the first housing.

* * * * *